Oct. 26, 1926.

G. H. DYER 1,604,741

DRAFT MECHANISM FOR TRACTORS AND TRAILERS

Filed Jan. 8, 1925    4 Sheets-Sheet 1

INVENTOR
GEORGE H. DYER
BY White Prost & Evans
HIS ATTORNEYS

Oct. 26, 1926.
G. H. DYER
1,604,741
DRAFT MECHANISM FOR TRACTORS AND TRAILERS
Filed Jan. 8, 1925
4 Sheets-Sheet 2
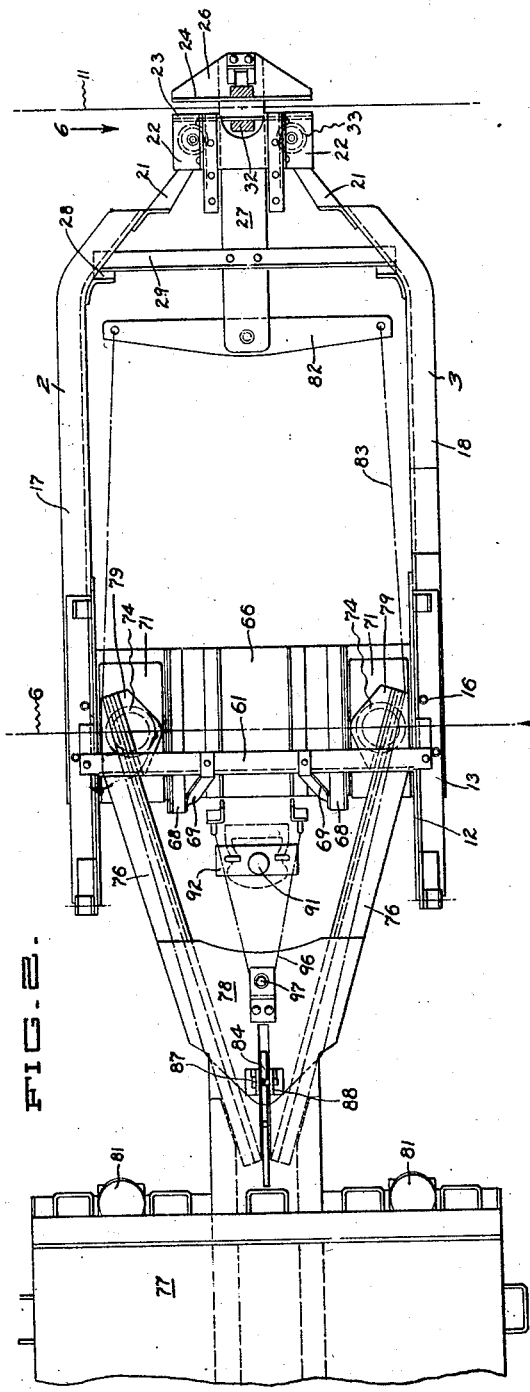
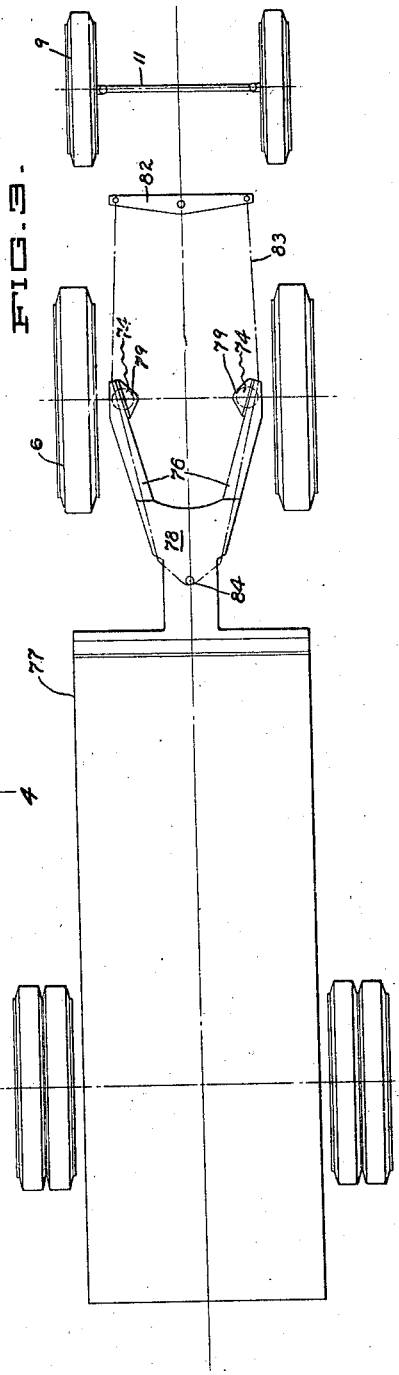
INVENTOR.
GEORGE H. DYER
BY White Prost & Evans
HIS ATTORNEYS

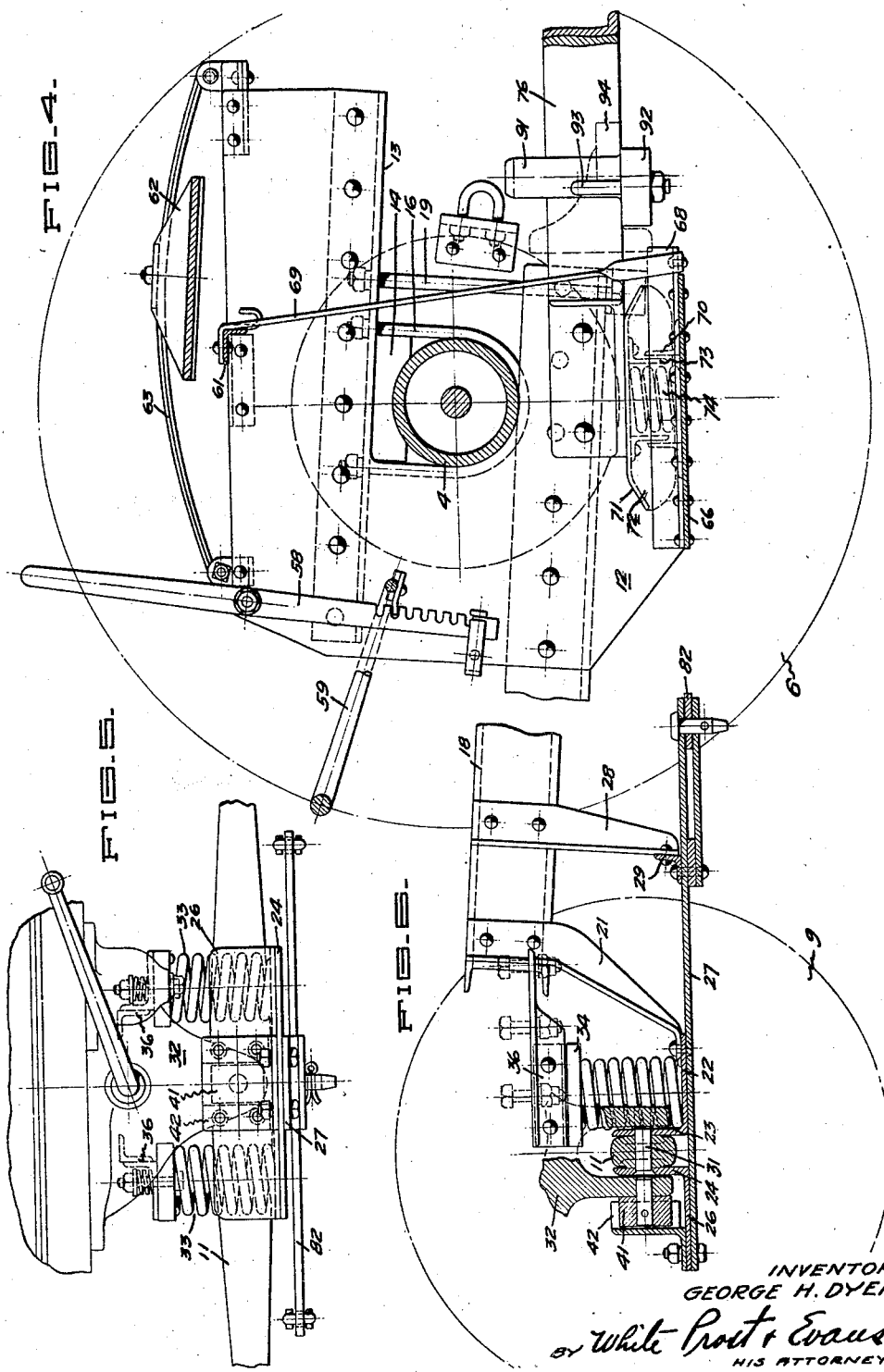

Oct. 26, 1926.  
G. H. DYER  
1,604,741  
DRAFT MECHANISM FOR TRACTORS AND TRAILERS  
Filed Jan. 8, 1925    4 Sheets-Sheet 4

INVENTOR  
GEORGE H. DYER  
BY White Prost + Evans  
HIS ATTORNEYS

Patented Oct. 26, 1926.

1,604,741

UNITED STATES PATENT OFFICE.

GEORGE H. DYER, OF SAN FRANCISCO, CALIFORNIA.

DRAFT MECHANISM FOR TRACTORS AND TRAILERS.

Application filed January 8, 1925. Serial No. 1,298.

My invention relates to tractors and trailers therefor and particularly to mechanism for connecting them. One of the objects of the invention is the provision of means for providing an improved connection between trailer and tractor whereby the tractor may be readily coupled to the trailer so as to provide a flexible connection between the two, and so that the pull on the tractor is distributed evenly and with a tendency to hold down the front end of the tractor.

Another object of the invention is the provision of a supplemental frame adapted to be arranged on a tractor of well known make and which measurably increases the usefulness and adaptability of the tractor with which it is used.

Another object of the invention is to provide a supplemental frame for a tractor of well known manufacture and embodying a spring suspension between the front of the frame and the load comprised in the motor assembly.

My invention possesses other objects and features of advantage, some of which with the foregoing, will be set forth in the following description of my invention. It is to be understood that I do not limit myself to the showing made by the said description as I may adopt variant forms of the invention within the scope of the claims.

Referring to the drawings:

Figure 2 is a plan view of the structure of my invention, the tractor mechanism proper being omitted except a portion shown in dotted lines.

Figure 3 is a diagrammatical view showing both tractor and trailer.

Fig. 4 is a side elevation of that portion of the tractor frame of my invention adjacent the rear wheels of the tractor; the direction of the view being indicated by the arrow in Fig. 2.

Fig. 5 is a front elevation of a portion of the apparatus, the direction of the view being indicated by the arrow 5 in Fig. 1.

Fig. 6 is a side elevation of the front portion of the tractor frame, the direction of the view being indicated by the arrow 6 in Fig. 2.

In terms of broad inclusion my device comprises an auxiliary frame adapted to be used in connection with a well-known type of tractor in which the motor assembly and rear axle housing are rigidly united. The additional frame not only distributes the towing strain more evenly over the tractor structure, but provides for spring suspension of the motor assembly in its relation to the front axle. It also provides seats on which the front end of a two-wheel trailer frame may be rested at a point below the axis of the driving wheels of the tractor. The frame also provides means whereby the towing stress tends not only to keep the trailer frame on its seats, but to prevent any tendency of the load to lift the front end of the tractor from the ground. That is to say, the towing stress is applied at a point on the tractor frame forward of and below the axis of the rear or driving wheels, so that in operation, the resolution of forces tend to revolve the front portion of the tractor frame downwardly about the axis of the rear wheels, thus keeping the tractor on the ground and permitting the exertion of the maximum tractive effort. The tractor frame is also provided with two seats which lie adjacent the drive wheels of the tractor, and are slidably engaged by the ends of two spaced beams extending from the trailer frame. Flexible towing means extend from the ends of these beams to an equalizer bar which distributes the towing stresses equally to the towing means.

Figure 1:
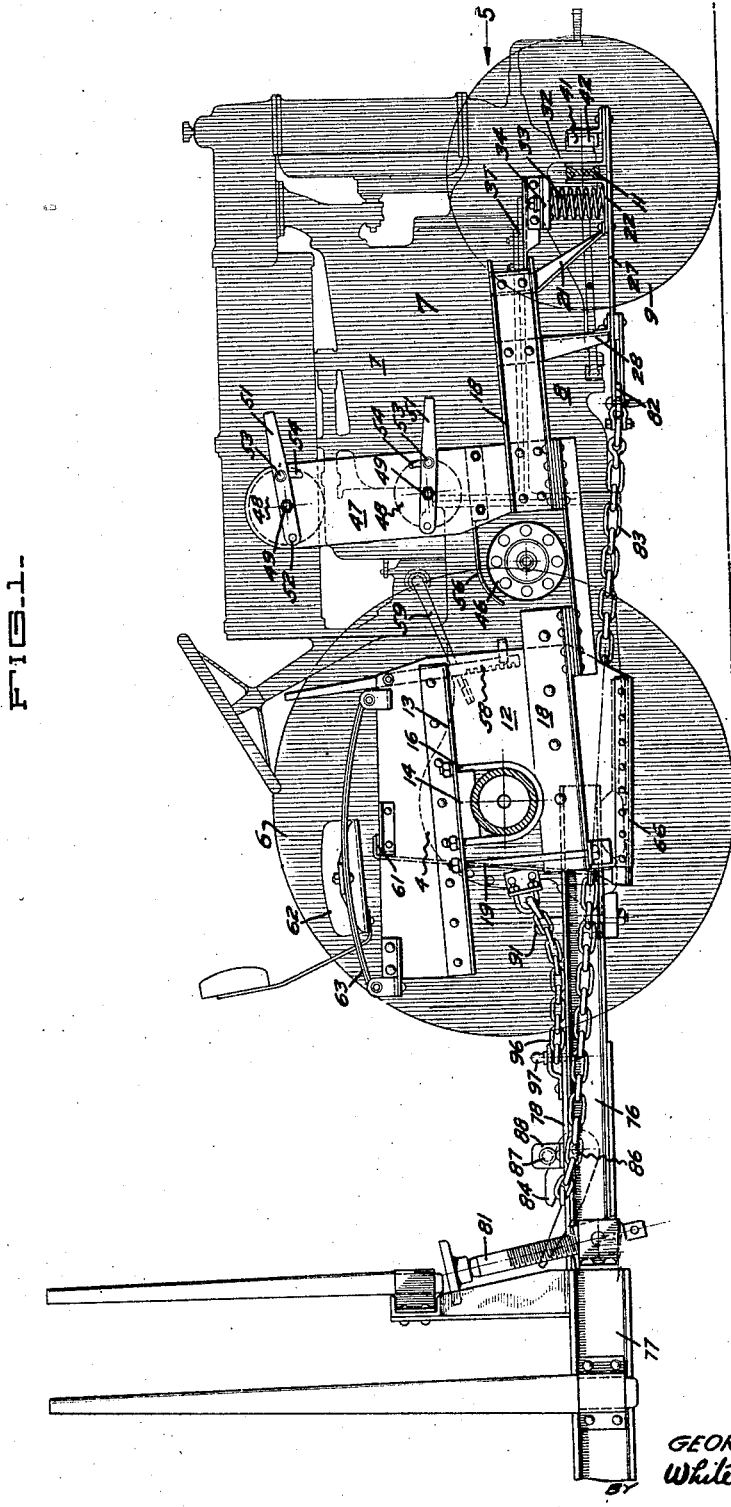
Figure 1 is a side elevation of the structure of my invention. The tractor to which it is applied is shown in shaded outline.
Figure 7:
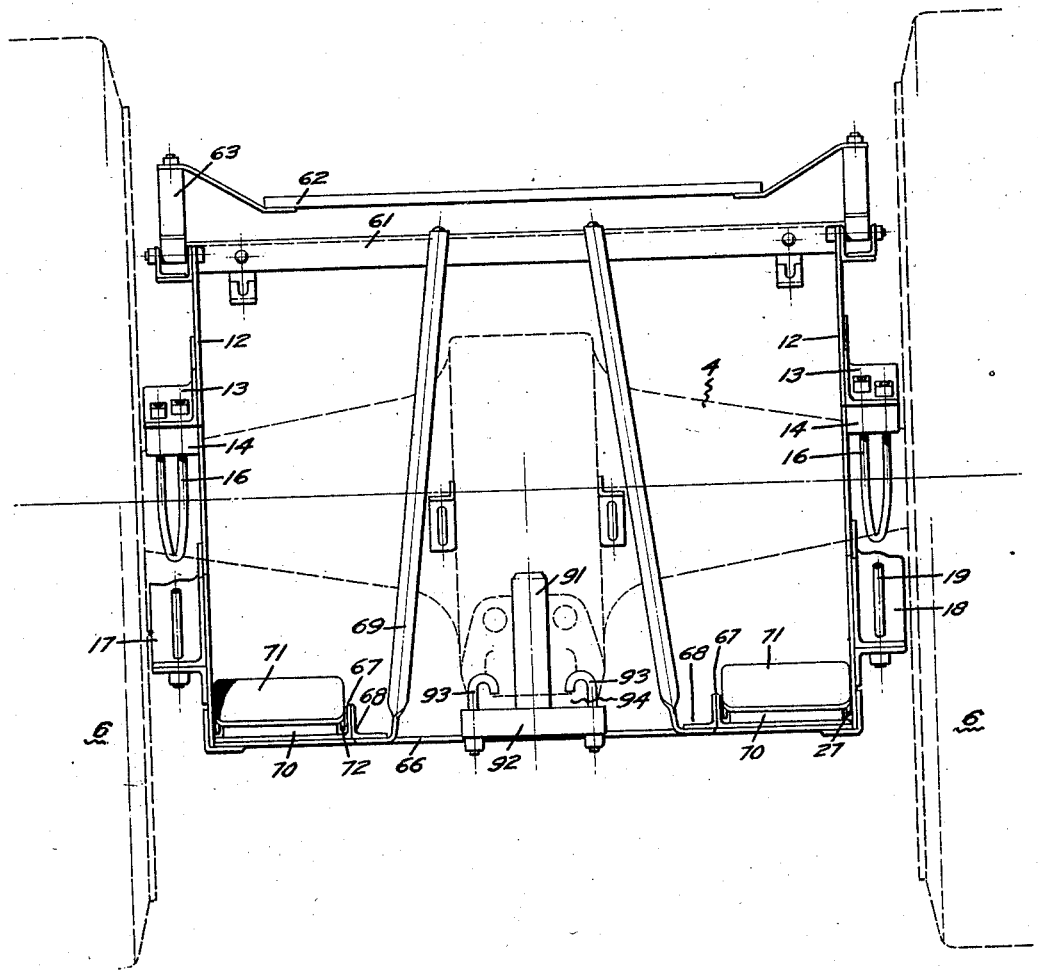
Fig. 7 is a rear elevation of the tractor mechanism, the frame being shown in full lines, and the rear axle housing and drive wheels of the tractor being shown in dotted lines.

In detail, my invention comprises two side members or frames adapted to be assembled on the sides of the tractor which is shown in shaded outline in Fig. 1 and which comprises rear axle housing 4, rear drive wheels 6, motor assembly 7, crank case 8, front wheels 9 and front axle 11. The side frames are each built up of structural steel elements and each consists of a vertical plate 12, having a flange 13, secured thereto to form a hanger, between which and the rear axle housing 4, a bearing block or sill 14, is held by the U-bolts 16, so as to permit pivotal motion, within narrow limits, of the plate 12 upon the rear axle housing. The plates 12 on each side are disposed on the rear axle housing adjacent the wheels, as best shown in Fig. 7, the U-bolts 16 being turned slightly out of parallelism with a plane perpendicular to the axis of the housing, since this position tends to prevent longitudinal shifting of the frame on the housing.

Secured to the plate 12 and extending forwardly are the beams 17 and 18, one on each side of the tractor. A tie bolt 19 thru the hanger 13 and the rear of the beam 18, helps to prevent spreading of the plate 12. At the front end of the tractor the beams 17 and 18 are bent toward each other as shown in Fig. 2 and are connected by pieces 21 with a short, broad angle iron having the horizontal and vertical walls 22 and 23, respectively. Spaced in front of this angle iron is a second angle iron comprising the vertical wall 24 and the horizontal wall 26, held in fixed relation to the angle iron 22—23 by the tow plate 27, rigidly secured to the walls 22 and 26. The tow plate is further braced to the frame beams 17 and 18 by means of brackets 28 carrying the transversely extending brace 29 secured adjacent its center to the tow plate.

Carried on the pivot pin 31 between the spaced vertical walls 23 and 24 is the front axle 11 of the tractor. The axle is thus capable of pivotal movement about a substantially horizontal axis with respect to the front end of the tractor frame. The axle and enclosing walls 23 and 24 lie between the motor supporting lugs 32 extending downwardly from the motor assembly, and a pair of heavy coil springs 33 are interposed between the motor assembly and the frame, the lower ends of the springs resting on the wall 22 adjacent its ends, and the upper ends of the springs resting against the blocks 34, secured to the brackets 36 held by suitable bolts thru the crank case flange 37. Lateral displacement of the motor assembly and the front end of the frame is prevented by a block 41, fixed on the front lug 32, and slidably disposed in the slide-way 42, fixed on the front end of the tow plate assembly. From the above it will be clear that while the front axle and wheels are not sprung with respect to the frame, the motor assembly is, and that the springs 33 will absorb much of the shock and vibration which would otherwise be transmitted to the motor.

In order to provide space for the driving pulley 46, the beam 18 is bridged around the pulley as shown in Fig. 1 and is provided with a vertically extending frame 47, in which idler pulleys 48 are mounted. These pulleys are useful in directing a driving belt from the pulley 46 to any machine which it is desired to operate from the pulley. The pulleys are mounted on shafts 49, the outer end of each of which is carried in the lever 51, mounted on the pivot pin 52, in the frame 47, and capable of being moved to adjust the position of the shaft 49 relative to the horizontal plane so as to properly handle the belt passing over the pulley. The lever is locked in the adjusted position by means of the bolt 53 passing thru a slot 54 in the frame 47. A guard plate 56 extends over the pulley 46 and a latch bar 58 notched at its lower end is adapted to engage a dog on the end of the clutch pedal 59, so that the clutch may be held in disengaged position by the setting of the latch 58, without the need of constant pressure by the foot of the operator.

The two side frames are connected together at the top of the plates 12, by a transverse bar 61, above which is the seat 62 suspended from the leaf springs 63, mounted on the side frames, as best shown in Fig. 4. The lower portions of the side frames are connected by a transversely extending plate 66, across which and adjacent each outer end is a vertical flange 67. Next to this piece is an angle iron 68 extending beyond the rear edge of the plate 66, as best shown in Fig. 2, and connected by the stiffening braces 69 with the upper transverse bar 61. As shown in Figs. 2 and 7 there is a space on each side between the flange 67 and the adjacent side plate 12, and extending across this space, but not touching the flange and wall are two spaced angle irons having the vertical flanges 70. Loosely slidable within the box-like structure thus formed is a shoe 71 having the side walls 72 in loose engagement with the walls 12 and 67 and provided with the downwardly extending flanges 73 loosely engaging the upstanding flanges 70. The shoe 71 is thus loosely vertically slidable and a heavy coil spring 74 is interposed between the shoe and its support so that a resilient seat is provided by the shoe on the upper surface of which may rest the ends of the beams 76 forming a rigidly connected part of the trailer frame 77. The beams 76 are preferably arranged as shown in Fig. 2, that is, diverging from the trailer frame, and braced by the plate 78, adjacent their juncture with the frame 77. The ends of the beams are broadened by angle plates 79 which form a flat surface adapted to engage the shoes.

Screw legs 81 are provided on the trailer frame to support the front end thereof while the trailer is being loaded so that the tractor may be backed in under the extending beams 76 to seat the plates 77 in the tractor frame when the two are to be coupled together.

Means are provided for connecting the trailer and tractor together. Pivotally mounted on the towing plate 27 is an equalizer bar 82, to the ends of which are attached the ends of a chain 83. The chain extends rearwardly from the equalizer bar to the ends of the beams 76 as shown by the dotted lines in Fig. 2 thence along the beams to a hook 84, Fig. 1, connected to the trailer frame by the pivot pin 86. The hook is thus capable of swinging forward to facilitate attachment of the chain and is held in the rearward position as shown in Fig. 1 by a lock pin 87, adapted to be passed loosely thru the lugs 88, fixed on the plate 78. When the tractor has been backed in under the trailer to seat the trailer beams 76 on the shoes 71 the tow chain may be readily engaged in the hook in its forward position and when the hook is thrown backwardly and locked the chain is drawn taut. It will be noticed that the point of attachment of the chain to the tractor frame is below the level of the engaging surfaces of the shoes 71, and that the point of attachment of the chain to the trailer is above such surface. There is thus a vertical component of the towing stress which tends to hold the trailer beams 76 upon their seats so that chattering at this point is avoided. It will also be noted that the point of attachment of the towing chain to the trailer is forward of and below the axis of the rear axle housing, that is, the axis of the drive wheels, and that it is also forward of and below the center of gravity of the tractor. There is thus a vertical component of the towing stress tending to move the front end of the tractor downwardly against the ground, so that the full tractive effort of the tractor may be felt.

Overrunning of the tractor by the trailer is avoided by the heavy pin 91, which is engaged by the front edge of the plate 78 on the trailer frame beams 76. The pin extends upwardly from a plate 92 held by hook bolts 93 to flanges 94, secured on the rear axle housing.

As a matter of safety it is preferred to provide an additional coupling chain 96, which is secured at one end to the rear axle housing and at the other end releasably held to the trailer beams 76 by the coupling pins 97.

I claim:

1. A tractor adapted for use with a trailer, comprising a frame, wheels supporting said frame, weight supporting means on said frame for seating the end of the trailer, a towing chain for connecting the frame and the trailer and means for securing the towing chain to the frame forward of and below the center of gravity of the tractor.

2. A tractor adapted for use with a trailer, comprising a frame, wheels supporting said frame, weight supporting means on said frame for seating the end of the trailer, a towing chain for connecting the frame and the trailer and means for securing the towing chain to the frame forward of and below the axis of the rear supporting wheels.

3. A tractor adapted for use with a trailer, comprising a frame, wheels supporting said frame, means on said frame for seating the end of the trailer, a bar pivoted adjacent its center to said frame forward of and below the axis of the rear supporting wheels, and towing chains for connecting the ends of said bar to the trailer.

4. The combination with a trailer having a frame, of a tractor comprising a frame, wheels supporting the tractor frame, means on said tractor frame for seating the end of the trailer frame, a bar pivoted adjacent its center to said tractor frame forward of and below the axis of the rear supporting wheels, and a towing chain secured at its ends to the ends of said bar and adjacent its middle to the trailer frame.

5. The combination with a trailer having a frame, of a tractor comprising a frame, wheels supporting the tractor frame, means on said tractor frame for seating the end of the trailer frame, a bar pivoted adjacent its center to said tractor frame forward of and below the axis of the rear supporting wheels, and towing chains attached to the ends of the bar and at a common point to the trailer frame.

6. A tractor comprising a rear axle housing, a motor assembly fixed to said housing, a frame mounted on said housing, a front axle pivoted on said frame and a spring interposed between the front end of the frame and the motor assembly.

7. In combination, a two-wheel trailer having a frame terminating at the front end in spaced beams, a tractor having a frame, a seat on each side of said tractor frame in which one of said beams rests, a bar pivoted adjacent its center to the tractor frame, and a chain secured to the trailer frame and extending from the end of each beam and secured to the corresponding end of said bar.

8. In combination, a two-wheel trailer having a frame terminating at the front end in spaced beams, a tractor having a frame, a shoe spring-mounted on each side of said tractor frame and providing a seat for receiving the end of one of said beams, and towing means connecting the two frames.

9. In combination, a two-wheel trailer having a frame terminating at the front end in spaced beams, a tractor having a frame, a seat on each side of said tractor frame in which one of said beams rests, and towing means connected to the trailer frame above the level of said seats and to the tractor frame below the level of said seats.

10. In a tractor the combination with a rear axle housing and a motor assembly fixed thereto, of frame side members mounted on the housing, a transverse tie bar connecting said side members above the housing, a transverse plate connecting said side members below said housing, and springs interposed between the front of the motor assembly and the side members.

11. The combination with a two-wheel trailer having a frame terminating at the front end in spaced beams and a tractor having the motor assembly fixed to the rear axle housing, of frame side members mounted on the housing, a transverse plate connecting the side members below said housing, shoes on said plate providing seats for the ends of the beams, towing means connecting the tractor to each of said beams, and means for equalizing the tension on said towing means.

12. In combination, a two-wheel trailer having a frame terminating at the front end in spaced beams, a tractor having a frame, a seat on each side of said tractor frame in which one of said beams rests, towing means connecting the tractor to each of said beams, and means for equalizing the tension on said towing means.

In testimony whereof, I have hereunto set my hand.

GEORGE H. DYER.